United States Patent
Memory (10) Patent No.: US 8,342,373 B2
(45) Date of Patent: Jan. 1, 2013

(54) VALVE AND METHOD FOR DENSE PHASE FLOW CONTROL

(75) Inventor: Russell James Memory, Saskatoon (CA)

(73) Assignee: CNH Canada, Ltd. (CA)

( * ) Notice: Subject to any disclaimer, the term of this patent is extended or adjusted under 35 U.S.C. 154(b) by 1000 days.

(21) Appl. No.: 12/271,765

(22) Filed: Nov. 14, 2008

(65) Prior Publication Data

US 2010/0124464 A1 May 20, 2010

(51) Int. Cl.
*B05B 7/00* (2006.01)

(52) U.S. Cl. ........... 222/630; 222/145.1; 222/1; 92/201; 277/434

(58) Field of Classification Search ............... 222/1, 335, 222/409, 251, 152, 145.5, 145.1, 129, 488, 222/388, 630; 92/199, 201; 277/436, 437, 277/439; 406/181, 49; 138/93
See application file for complete search history.

(56) References Cited

U.S. PATENT DOCUMENTS

| 524,474 A | 8/1894 | Wade |
| 670,534 A | 3/1901 | Carmical |
| 1,369,649 A | 2/1921 | Gieseler |
| 1,451,446 A * | 4/1923 | Mills ............................. 222/388 |
| 2,062,295 A | 12/1936 | Cary et al. |
| 2,171,205 A | 8/1939 | Zinke |
| 2,193,738 A | 3/1940 | Perrin |
| 2,559,183 A | 7/1951 | Barnett |
| 2,671,690 A | 3/1954 | Von Ehrenkrook |
| 2,797,972 A * | 7/1957 | Martin ............................ 92/111 |
| 2,814,531 A | 11/1957 | Murray, Jr. |
| 2,822,050 A * | 2/1958 | Conrad ........................ 277/333 |
| 2,937,049 A | 5/1960 | Osawa |
| 3,197,261 A | 7/1965 | Kauffman |
| 3,207,560 A | 9/1965 | Brown |
| 3,303,974 A * | 2/1967 | Bleuler ......................... 222/445 |
| 3,376,897 A | 4/1968 | Dolder et al. |
| 3,386,474 A | 6/1968 | Kimmel |
| 3,387,895 A | 6/1968 | Hochmuth et al. |
| 3,515,315 A | 6/1970 | Kidd |
| 3,543,704 A | 12/1970 | Hansen |
| 3,548,765 A | 12/1970 | Grataloup |
| 3,722,895 A * | 3/1973 | Mevissen ...................... 277/583 |
| 4,036,408 A | 7/1977 | Dugge |

(Continued)

FOREIGN PATENT DOCUMENTS

BR 9501580-9 A 11/1995

(Continued)

*Primary Examiner* — Kevin P Shaver
*Assistant Examiner* — Robert Nichols, II
(74) *Attorney, Agent, or Firm* — Rebecca Henkel (57) ABSTRACT

A valve for controlling a flow of granular material and fluid comprises a body having a first end, a second end, and defining an interior surface. An inlet is formed proximate the first end for receiving the granular material and fluid. An outlet is formed downstream of the inlet for selectively discharging the granular material and fluid. A first member is slideably captured within the body and a resilient member is operationally coupled to the first member. The first member is moveable between an open position at which the granular material and fluid flow through the outlet, and a closed position upstream of the outlet at which the granular material is substantially prevented from flowing through the outlet. The resilient member is moveable between a retracted position and an expanded position at which it is engaged with the interior surface to substantially prevent the fluid from flowing through the outlet.

12 Claims, 7 Drawing Sheets

U.S. PATENT DOCUMENTS

| | | | |
|---|---|---|---|
| 4,082,364 A | 4/1978 | Krambrock | |
| 4,200,412 A | 4/1980 | Steele | |
| 4,244,522 A | 1/1981 | Hartwig | |
| 4,264,243 A | 4/1981 | Bentzen-Bilkvist | |
| 4,280,419 A | 7/1981 | Fischer | |
| 4,342,336 A * | 8/1982 | Satterthwaite et al. | 138/90 |
| 4,379,664 A | 4/1983 | Klein et al. | |
| 4,413,935 A | 11/1983 | Smith et al. | |
| 4,506,704 A | 3/1985 | Boom et al. | |
| 4,553,882 A | 11/1985 | Knappertz | |
| 4,562,779 A | 1/1986 | Briggs | |
| 4,674,922 A | 6/1987 | Federhen et al. | |
| 4,738,770 A | 4/1988 | Hastings et al. | |
| 4,779,765 A | 10/1988 | Neumeyer | |
| 4,793,743 A | 12/1988 | Grodecki et al. | |
| 4,843,983 A | 7/1989 | Olson | |
| 4,872,785 A | 10/1989 | Schrage et al. | |
| 4,907,727 A * | 3/1990 | Ernst et al. | 222/386.5 |
| 5,033,914 A | 7/1991 | Wuertele et al. | |
| 5,069,583 A | 12/1991 | Caldwell | |
| 5,156,102 A | 10/1992 | Andersen | |
| 5,161,473 A | 11/1992 | Landphair et al. | |
| 5,240,355 A | 8/1993 | Hudalla | |
| 5,341,726 A * | 8/1994 | Watson | 92/80 |
| 5,379,706 A | 1/1995 | Gage et al. | |
| 5,392,722 A | 2/1995 | Snipes et al. | |
| 5,407,305 A | 4/1995 | Wallace | |
| 5,494,381 A | 2/1996 | Heyl et al. | |
| 5,575,225 A | 11/1996 | Smith et al. | |
| 5,749,682 A | 5/1998 | Epting | |
| 5,813,801 A | 9/1998 | Newbolt et al. | |
| 5,878,679 A | 3/1999 | Gregor et al. | |
| 5,927,217 A | 7/1999 | Halford et al. | |
| 6,047,652 A | 4/2000 | Prairie et al. | |
| 6,253,693 B1 | 7/2001 | Mayerle et al. | |
| 6,298,797 B1 | 10/2001 | Mayerle et al. | |
| 6,308,645 B1 | 10/2001 | Newkirk et al. | |
| 6,308,646 B1 | 10/2001 | Luxon | |
| 6,311,727 B1 | 11/2001 | Campau | |
| 6,343,896 B1 | 2/2002 | Goodier et al. | |
| 6,499,413 B2 | 12/2002 | Kleinknecht et al. | |
| 6,505,569 B1 | 1/2003 | Richard | |
| 6,581,532 B1 | 6/2003 | Hagen et al. | |
| 6,584,919 B2 | 7/2003 | McQuinn | |
| 6,644,225 B2 | 11/2003 | Keaton | |
| 6,648,558 B1 | 11/2003 | Shultz | |
| 6,742,464 B1 | 6/2004 | Chiu | |
| 6,782,835 B2 | 8/2004 | Lee et al. | |
| 6,854,405 B2 | 2/2005 | Memory | |
| 6,899,042 B1 | 5/2005 | Kowalchuk | |
| 6,904,851 B2 | 6/2005 | Memory | |
| 6,928,938 B2 | 8/2005 | Memory | |
| 6,928,939 B1 | 8/2005 | Johnson et al. | |
| 6,935,254 B2 | 8/2005 | Ostrander et al. | |
| 7,017,502 B2 | 3/2006 | Quam et al. | |
| 7,040,242 B2 | 5/2006 | Memory | |
| 7,048,475 B2 | 5/2006 | Cloue et al. | |
| 7,101,120 B2 | 9/2006 | Jurkovich | |
| 7,213,525 B2 | 5/2007 | Meyer et al. | |
| 7,267,061 B2 | 9/2007 | Mayerle | |
| 7,270,064 B2 | 9/2007 | Kjelsson et al. | |
| 2006/0243179 A1 | 11/2006 | Landphair et al. | |
| 2007/0022928 A1 | 2/2007 | Kowalchuk | |
| 2007/0181048 A1 | 8/2007 | Pleyer | |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 A | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

* cited by examiner

VALVE AND METHOD FOR DENSE PHASE FLOW CONTROL

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates generally to flow control of granular material, and more particularly, to a valve and method for dense phase flow control.

BACKGROUND OF THE INVENTION

Many agricultural processes require the delivery of a granular material, such as seed, fertilizer, and the like, from a bulk storage tank toward an outlet or secondary containment system. The granular material is often motivated pneumatically through a series of lines. The flow of granular material through the lines is typically classified as one of two general types, specifically, the granular material may be motivated in a dilute phase flow or in a dense phase flow. During dilute phase flow, the volume percentage of air in the line is much greater relative to the volume percentage of granular material. Alternatively, during dense phase flow the relative ratio is reversed, meaning that a greater volume percentage of granular material is motivated through the line by a lower volume percentage of air.

In certain dense phase flow applications, the bulk storage tank(s) are pressurized relative to the ambient environment to provide a motivating force to urge the granular material from the bulk storage tank through the lines. In an alternative dense phase flow application, an induction system is used to transfer the granular material from the bulk storage tank and into the pressurized dense phase delivery system. For example, the granular material is mechanically extracted from the bulk storage tank (generally maintained at approximately atmospheric pressure) into a primary containment tank. The primary containment tank is pressurized relative to the ambient environment to again provide a motivating force to urge the granular material through the lines.

Regardless of the system used to motivate the granular material into the delivery system, the distribution of the granular material through the lines may be managed by various valves, regulators, and the like that control and direct the level of granular material flowing into downstream secondary containments. However, the use of these various control mechanisms may present several substantial considerations and challenges. For example, in the agricultural context, most dense phase distribution systems must be efficient because an agricultural vehicle/implement has inherent power supply limitations, be it hydraulic, pneumatic, electric, and the like. Therefore, wasteful and inefficient use of these power supplies is generally avoided. Moreover, most granular material is susceptible to damage caused by the transfer process. For example, the granular material (e.g., seed) may be damaged by excessive forces encountered by the control valving or mechanism. Additionally, efficient dense phase flow is aided by providing a continual supply of granular material. This is partially achieved through the use of valves that are capable of controlling the flow of granular material over repeated cycles without clogging or binding.

In view of at least the preceding considerations, a need exists for an efficient, reliable valve for controlling the continual flow of granular material while minimizing damage to the granular material.

SUMMARY OF THE INVENTION

In accordance with one aspect of the invention, a valve for controlling a flow of a granular material and a flow of a fluid comprises a body having a first end, a second end, and defining an interior surface. An inlet is formed proximate the first end of the body for receiving the granular material and the fluid. An outlet is formed downstream of the inlet for selectively discharging the granular material and the fluid. A first member is slideably captured within the body and a resilient member is operationally coupled to the first member. The first member is moveable between an open position at which the granular material and the fluid flow through the outlet, and a closed position upstream of the outlet at which the granular material is substantially prevented from flowing through the outlet. The resilient member is moveable between a retracted position and an expanded position at which the resilient member is engaged with the interior surface to substantially prevent the fluid from flowing through the outlet.

The first member may further comprise an upstream surface, a downstream surface opposite the upstream surface, and an annular surface extending between the upstream surface and the downstream surface, wherein the resilient member is operationally coupled to the annular surface of the first member.

A first passageway may be formed within the first member that is in fluid communication with the annular surface and an activation source, wherein the activation source selectively directs an activation medium within the first passageway to move the resilient member to the expanded position.

A connecting member may be coupled to and extend from the first member toward the second end of the body, a second member may be spaced apart from the first member and coupled to the connecting member, and an activation chamber may be defined by the second member, the second end of the body, and the interior surface, wherein the activation source is in selective fluid communication with the activation chamber to move the first member to the closed position.

Additionally, a second passageway may be formed in the connecting member and an insert may be configured to moveably engage the second passageway defining an insert chamber, wherein (i) the second passageway is in fluid communication with the first passageway formed within the first member, (ii) the insert is moveable between an inactive position defining a first volume of the insert chamber and an active position defining a second volume of the insert chamber, (iii) the second volume of the insert chamber is less than the first volume of the insert chamber, and (iv) moving the insert to the active position moves the resilient member to the expanded position.

A stop member may be positioned proximate the outlet and between the first member and the second member to limit an axial travel of the first member and the second member within the body.

A first biasing member may urge the first member toward the stop member and a second biasing member may urge the insert toward the inactive position.

The first biasing member may comprise a first compression spring positioned between the stop member and the second member, and the second biasing member may comprise a second compression spring positioned between the second biasing member and a flange formed on the insert.

A return chamber may be defined between the stop member and the second member, and a return port may be in fluid communication with the return chamber and in selective fluid communication with a return source, wherein when the return port is in fluid communication with the return source the second member is biased toward the second end of the body.

A surge chamber may be positioned upstream of the outlet and be in fluid communication with an interior of the body.

The surge chamber may define a transfer surface that is sloped toward the interior of the body at a transfer angle approximately equal to or greater than an angle of repose defined by the granular material.

The first member may further comprise an upstream surface, a downstream surface opposite the upstream surface, and an annular surface extending between the upstream surface and the downstream surface, wherein the resilient member is operationally coupled to at least one of the upstream surface and the downstream surface of the first member.

At least one electromagnetic actuator may be operationally coupled to at least one of the first member to selectively move the first member between the open position and the closed position, and the resilient member to selectively move the resilient member between the retracted position and the expanded position.

In accordance with another aspect of the invention, a valve for controlling dense phase flow of a granular material and air comprises a cylindrical valve body having an inlet, a discharge downstream of the inlet, and an end offset from the inlet. A stop member is positioned between the discharge and the end. An axial bore is formed through the stop member and a connecting member slideably extends through the axial bore. An axial passageway is formed in the connecting member. A disk is coupled to a first end of the connecting member defining an annular surface configured to slideably engage an interior surface of the cylindrical valve body. At least one passageway is formed in the disk extending through the annular surface and in fluid communication with the axial passageway formed in the connecting member. A piston is coupled to a second end of the connecting member and configured to slideably engage and substantially seal against the interior surface of the cylindrical valve body. A chamber is defined between the piston and the end of the cylindrical valve body. A flexible diaphragm is operatively coupled to the disk proximate the annular surface of the disk and is in fluid communication with the passageway formed in the disk. The disk is moveable between a flow position at which the granular material and the air flow from the inlet toward the discharge and a plugged position at which the granular material is substantially prevented from flowing through the discharge. The flexible diaphragm is moveable between a sliding position and a sealing position at which the flexible diaphragm engages the interior surface of the cylindrical valve body. And, wherein applying an activation medium to the chamber urges the piston toward the stop member and the disk toward the inlet and beyond the discharge to substantially stop the flow of granular material through the discharge, and urges the flexible diaphragm from the sliding position to the sealing position to substantially stop the flow of air through the discharge.

An insert may be configured to moveably engage the axial passageway defining an insert chamber, wherein (i) the insert is moveable between an inactive position defining a first volume of the insert chamber and an active position defining a second volume of the insert chamber, (ii) the second volume of the insert chamber is less than the first volume of the insert chamber, and (iii) moving the insert to the active position moves the flexible diaphragm to the sealing position.

The activation medium may be air.

A surge chamber may be positioned upstream of the discharge.

The surge chamber may define a transfer surface that is sloped downward at a transfer angle greater than an angle of repose defined by the granular material.

In accordance with a further aspect of the invention, a method of controlling a flow of a granular material and a flow of a fluid comprises: (i) providing a body having a first end, a second end, and defining an interior surface, an inlet formed proximate the first end of the body for receiving the granular material and the fluid, an outlet formed downstream of the inlet for selectively discharging the granular material and the fluid, a first member slideably captured within the body, and a resilient member operationally coupled to the first member; (ii) actuating the first member from an open position at which the granular material and the fluid flow through the outlet to a closed position upstream of the outlet at which the granular material is substantially prevented from flowing through the outlet; and (iii) actuating the resilient member from a retracted position to an expanded position at which the resilient member is engaged with the interior surface of the body to substantially prevent the fluid from flowing through the outlet.

The foregoing and other aspects of the invention will appear in the detailed description that follows. In the description, reference is made to the accompanying drawings that illustrate example embodiments of the invention.

DETAILED DESCRIPTION OF THE EXAMPLE EMBODIMENTS

The following applications, each having a filing date of Nov. 14, 2008, are hereby incorporated by reference as if fully set forth herein: U.S. application Ser. No. 12/271,618 ("Sectional Distribution of Granular Product"); U.S. application Ser. No. 12/271,679 ("Agricultural Implement with Dense Phase Product Flow from a Primary Container"); U.S. application Ser. No. 12/271,723("Device and Method for Dense Phase Transport of Seed"); U.S. application Ser. No. 12/271,745 ("Agricultural Implement with Dense Phase Product Dispensing and Purging"); U.S. application Ser. No. 12/271,787 ("Dense Phase Distribution Branch"); U.S. application No. 12/271,808 ("Pressure Supply Assembly for an Agricultural Implement with Dense Phase Product Flow"); U.S. application Ser. No. 12/271,816 ("Dense Phase Induction System and Method"); and U.S. application No. 12/271,822 ("Granular Containment Assembly and Method").

Figure 1:
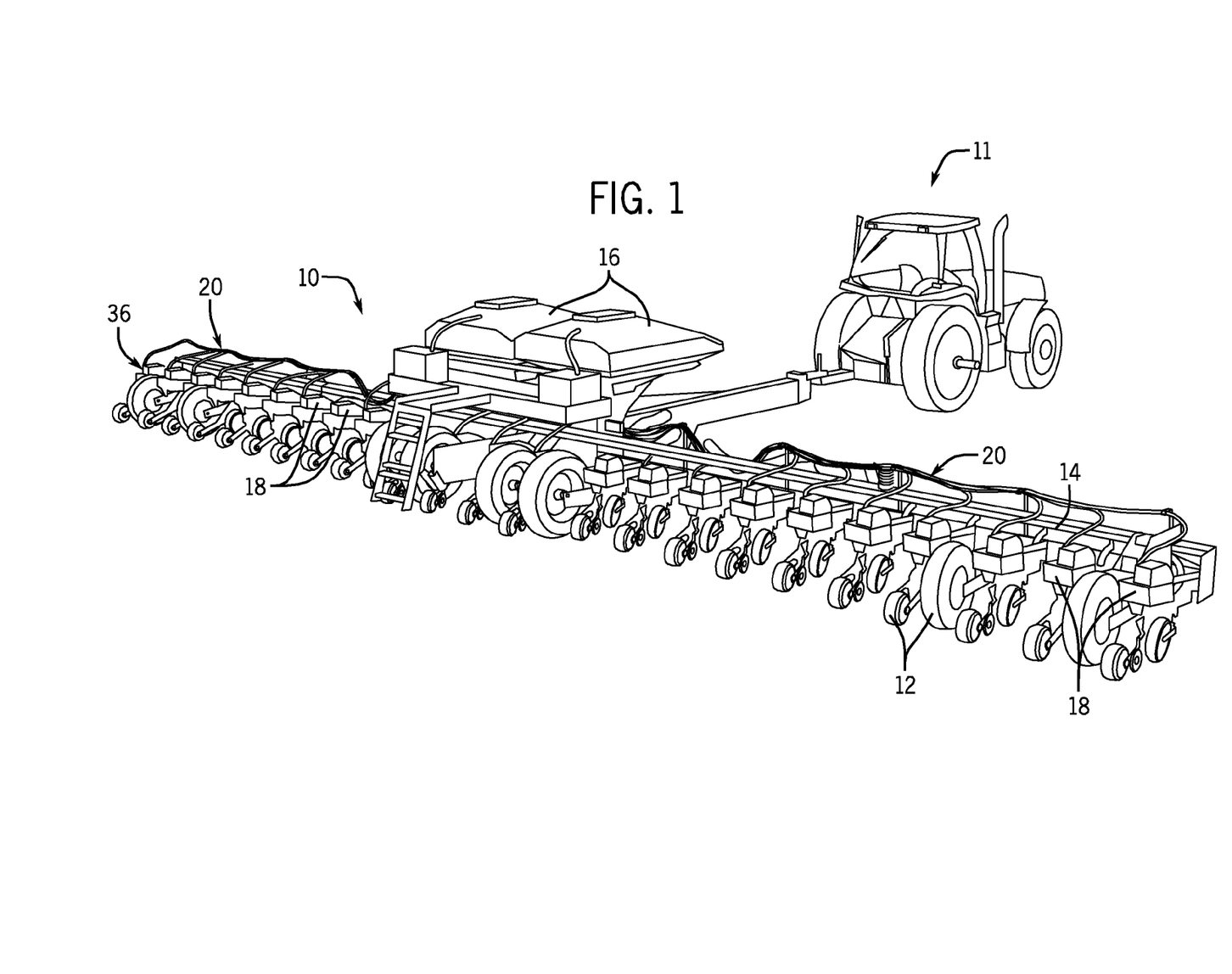
FIG. 1 is a simplified isometric view of an agricultural vehicle and an implement incorporating an aspect of the invention.
Figure 2:
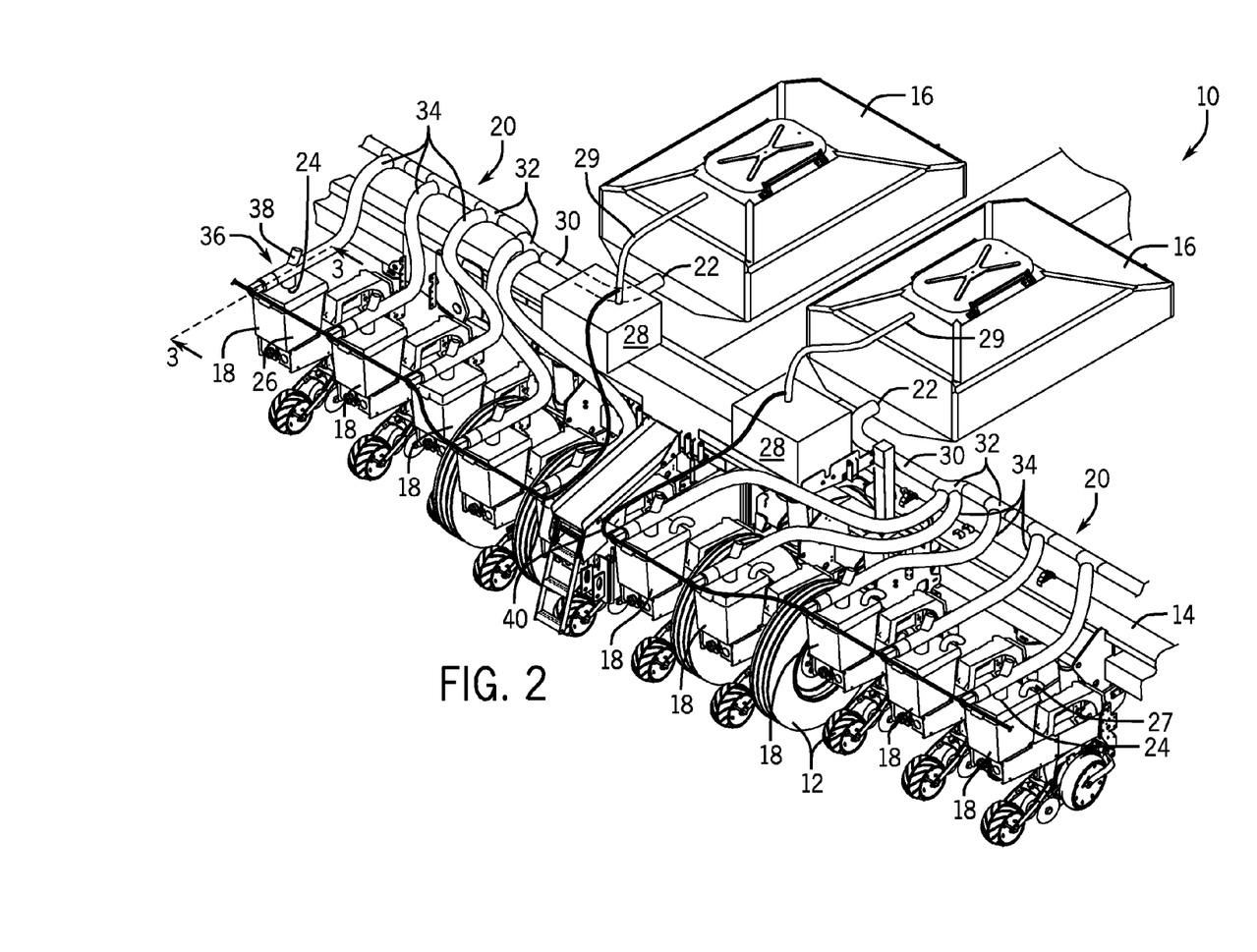
FIG. 2 is a more detailed partial isometric view of the implement of FIG. 1.

A partial perspective view of an agricultural implement 10 incorporating a valve 36 in accordance with an aspect of the invention is shown generally in FIGS. 1-2. The valve 36 is described in the context of the agricultural industry and the distribution of granular material, such as seed, fertilizer, and the like; however, the description is not intended to be limiting. As a result, the valve 36 disclosed and claimed may be implemented in a variety of industries and contexts to distribute a range of granular materials.

Referring now to FIGS. 1 and 2, a simplified depiction of an agricultural implement 10 is shown coupled to a vehicle 11 for the distribution of a granular material. Various wheels 12 are mounted to a frame 14 to allow the vehicle 11 (e.g., a tractor) to move the agricultural implement 10 along the ground. The frame 14 includes two bulk or primary containment tanks 16 for holding and dispensing the granular material toward a plurality of secondary containments 18. In the example embodiment, the dense phase delivery lines 20 each have an inlet 22, which connects to one of the primary containment tanks 16, and one or more outlets 24, which connect to each of the secondary containments 18. The dense phase delivery lines 20 place the primary containment tanks 16 and the secondary containments 18 into selective communication with one another and are used to transport the granular material.

Generally, the agricultural implement 10 is designed such that the primary containment tanks 16 hold relatively large amounts of granular material that is distributed to each of the secondary containments 18 for temporary containment, metering, and distribution during seeding, fertilizing, or the like. In the example embodiment, the secondary containments 18 each include a containment reservoir 26 for temporary storage of the granular material, a meter for metering the granular material, and a distributor for distributing the granular material. The top of the secondary containments 18 also include a vent 27 that permits excess air to escape from the top of the secondary containment 18.

In the example embodiment, a pressure supply 28 is used to provide the necessary motivation to transport the granular material from the primary containment tanks 16 to each of the secondary containments 18 via the dense phase delivery lines 20. The pressure supply 28 is connected to the primary containment tanks 16 via a hose 29 to pressurize the primary containment tanks 16. As one skilled in the art will appreciate, and in view of the related disclosures noted above and incorporated herein, the granular material may be conveyed to the secondary containments 18 in a variety of manners (e.g., an auger, an induction chamber, and the like). As discussed in greater detail below, the pressure supply 28 in the example embodiment described is also the activation source that provides an activation medium (e.g., air) to aid the operation of the valve 36. Alternatively, the activation source may be a dedicated system and/or be configured to manipulate other media (e.g., hydraulic fluid).

In the form shown in FIG. 2, the flow of granular material is motivated pneumatically, using pressurized air from the pressure supplies 28. These pressure supplies 28 provide pressurized air to the primary containment tanks 16, raising the pressure in the primary containment tanks 16 relative to the ambient pressure. As the pressure in the primary containment tanks 16 increases, a pressure differential occurs between the primary containment tanks 16 and the secondary containments 18 causing the granular material and air from the primary containment tanks 16 to move through the dense phase delivery lines 20 and into the desired secondary containments 18. While air is preferred as the motivating fluid in the pressure supplies 28, other fluids, such as water, liquid fertilizer, etc., may be fed under pressure into the delivery lines 20 to thereby motivate the granular material.

Returning to the structure of the example dense phase delivery line 20, the dense phase delivery line 20 includes a root portion 30 that includes one or more splits 32. Each of these splits 32 divides the dense phase delivery line 20 to form a plurality of branches 34 downstream of the splits 32. Thus a pathway is provided from the primary containment tank 16 to each of the secondary containments 18.

A valve 36 is located proximate the outlet 24 of each end of the dense phase delivery branches 34. The valve 36 is configured to selectively control the flow of both the granular material and the air flowing through the delivery lines 20. The valve 36 at the end of each of the branch 34 can be individually actuated to start or stop the flow of the granular material and air through the branch 34 to fill the secondary containments 18 at the desired times to the desired levels.

Figure 3:
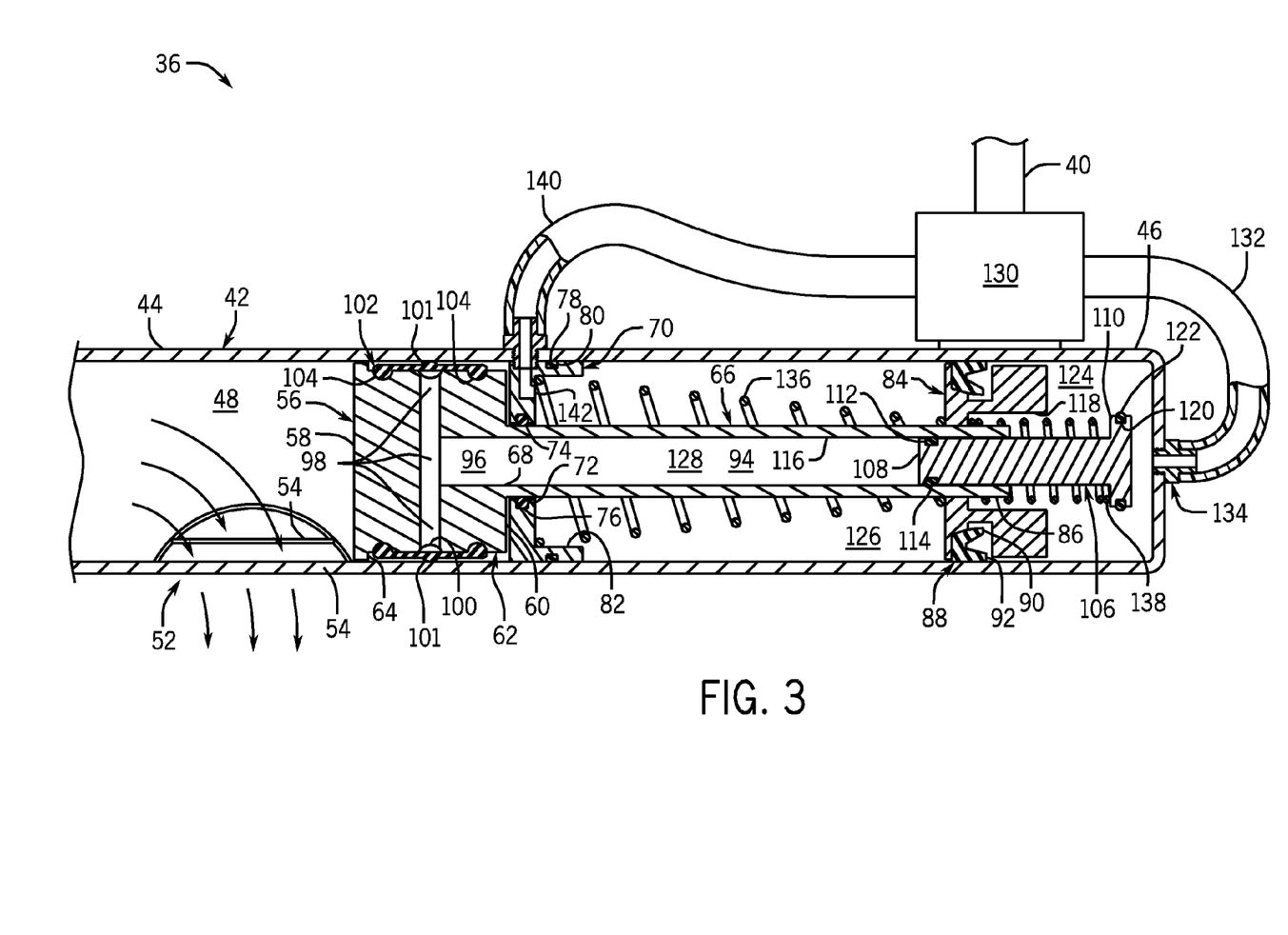
FIG. 3 is a partial section view generally along line 3-3 of the example valve shown in FIG. 2, having the example valve control moved for clarity, in which the granular material and fluid flow through the valve.

With additional reference to FIG. 3, a valve line 40 may be coupled to the valves 36 such that the pressure supply 28 is also the activation source supplying air as an activation medium. As one skilled in the art will appreciate, while a pneumatic activation source is preferable in the disclosed embodiment, many other activation sources and activation media are suitable. For example, a hydraulic activation source and hydraulic fluid medium may be used to actuate the valve 36 in accordance with the general principles discussed below. Alternatively, the valves 36 may be driven or actuated in any number of ways including other mechanical and electrical forms of actuation (e.g., an electromechanical actuator, such as a coil and armature arrangement). Moreover, the valve 36 is useable with many types of induction systems provided that the valve 36 is capable of overcoming the resistive force exerted on the valve 36 by the granular material and fluid.

The example valve 36 for controlling the flow of granular material and flow of a fluid includes a cylindrical body 42 having a first end 44 and a second end 46 offset from the first end 44. The cylindrical body 42 generally defines a cylindrical interior surface 48. An inlet 50 (shown in FIGS. 4 and 5) is formed in the cylindrical body 42 proximate the first end 44 and is configured to receive the granular material (e.g., seed, fertilizer, etc.) and the fluid (e.g., air, etc.). An outlet or discharge 52 is formed downstream of the inlet 50 for selectively discharging the granular material and the fluid when the valve 36 is in the appropriate state (described below). In the example embodiment, a series of longitudinal rails 54 extend across the discharge 52 to capture and guide a first member or disk 56 that is slideably captured within the body 42.

Figure 6:
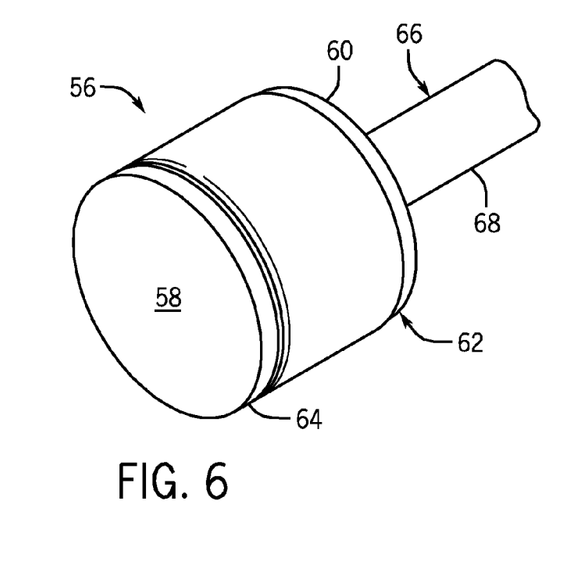
FIGS. 6 and 7 show alternative members for use in the valve.

With additional reference to FIG. 6, the disk 56 of the example embodiment is generally cylindrical and defines an upstream surface 58, a downstream surface 60 opposite the upstream surface 58, and an annular surface 62 that extends between the upstream surface 58 and the downstream surface 60. The annular surface 62 includes a leading rim 64 that is closely toleranced to the interior surface 48 of the cylindrical body 42 such that the disk 56 may slideably engage the interior surface 48 during operation of the valve 36. For example, the radial clearance between the leading rim 64 and the interior surface 48 may be approximately twelve thousands (0.012) of an inch. A connecting member 66 includes a first end 68 that is coupled to the disk 56. The connecting member 66 and the disk 56 are shown integrally formed, but may be separate components coupled in any manner known to a person skilled in the art (e.g., threadably engaged, welded, etc.).

A ring-shaped stop member 70 is secured within the cylindrical body 42 between the discharge 52 and the second end 46. The stop member 70 may be secured to the cylindrical body 42 in a variety of manners, such as, welds, bolts, adhesives, and the like, or may be integral with the cylindrical body 42. The stop member 70 defines an axial bore 72 through which the connecting member 66 slideably extends toward the second end 46 of the cylindrical body 42. A seal 74 (e.g., shown as an o-ring) is seated in an annular groove 76 and engages the connecting member 66 to prevent or reduce the amount of air passing through the axial bore 72 in the stop member 70. Additionally, a seal 78 is seated in an external annular groove 80 formed in flange 82 to further prevent or reduce the amount of air passing between the interior surface 48 of the cylindrical body 42 and the stop member 70.

With continued reference to FIG. 3, a second member or piston 84 is spaced apart from the disk 56 and is coupled to (or integrally formed with) a second end 86 of the connecting member 66. The piston 84 slideably engages and substantially seals against the interior surface 48 of the cylindrical body 42 via an annular seal 88. The annular seal 88 of the example embodiment includes an inner leg 90 and an outer leg 92 that flexes to ride along and seal against the interior surface 48 of the cylindrical body 42 during operation of the valve 36. The annular seal 88 may be formed of plastic, rubber, composites, and the like. One skilled in the art will appreciate the various alternative seal configurations.

Returning to the structure and configuration of the disk 56 and the connecting member 66, an axial passageway 94 is formed within the connecting member 66 that leads between the second end 86 of the connecting member 66 and the disk 56. Specifically, in the example embodiment shown in FIG. 3, the disk 56 defines an opening 96 leading from the axial passageway 94 of the connecting member 66 to a plurality of radial passageways 98 that extend toward an annular channel 100 formed proximate the annular surface 62 of the disk 56. One skilled in the art will appreciate that the passageways 98 formed in the disk 56 need not be radial and that the annular channel 100 may take on a variety of configurations or need not be present.

A resilient member or flexible diaphragm 102 is operatively coupled to the disk 56 such that when the flexible diaphragm 102 is expanded it seals against the interior surface 48 of the cylindrical body 42. In the example embodiment shown in FIGS. 3-5, the flexible diaphragm 102 is made of polyethylene and is co-molded into annular depressions 104 formed in the annular surface 62 of the disk 56 to establish an air-tight seal between the flexible diaphragm 102 and the disk 56. In a preferred form, the flexible diaphragm 102 includes an external annular rib 101 approximately between the longitudinal extremes of the flexible diaphragm 102. The annular rib 101 enhances the seal created between the flexible diaphragm 102 and the interior surface 48 when the flexible diaphragm 102 is expanded. As one skilled in the art will appreciate, the flexible diaphragm 102 may be made from any number or combination of resilient, flexible materials (e.g., rubber). Moreover, the resilient member or flexible diaphragm 102 may be coupled to the disk 56 in a variety of manners, such as by adhesive, annular bands, sonic welding, and the like depending on the application requirements and the composition of the relative materials.

Figure 4:
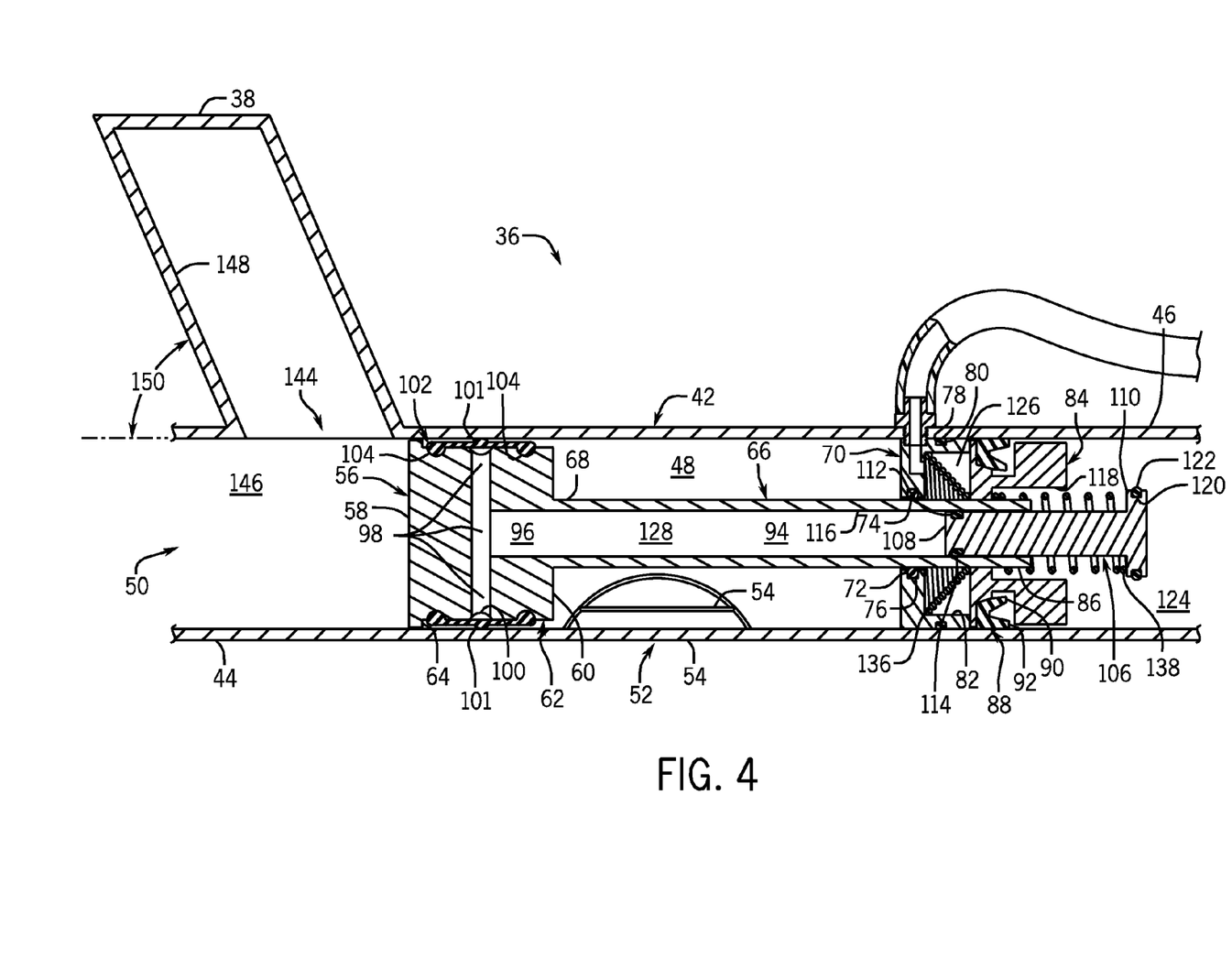
FIG. 4 is a partial section view of the example valve shown in FIG. 2 in which the granular material is substantially prevented from flowing through the valve.
Figure 5:
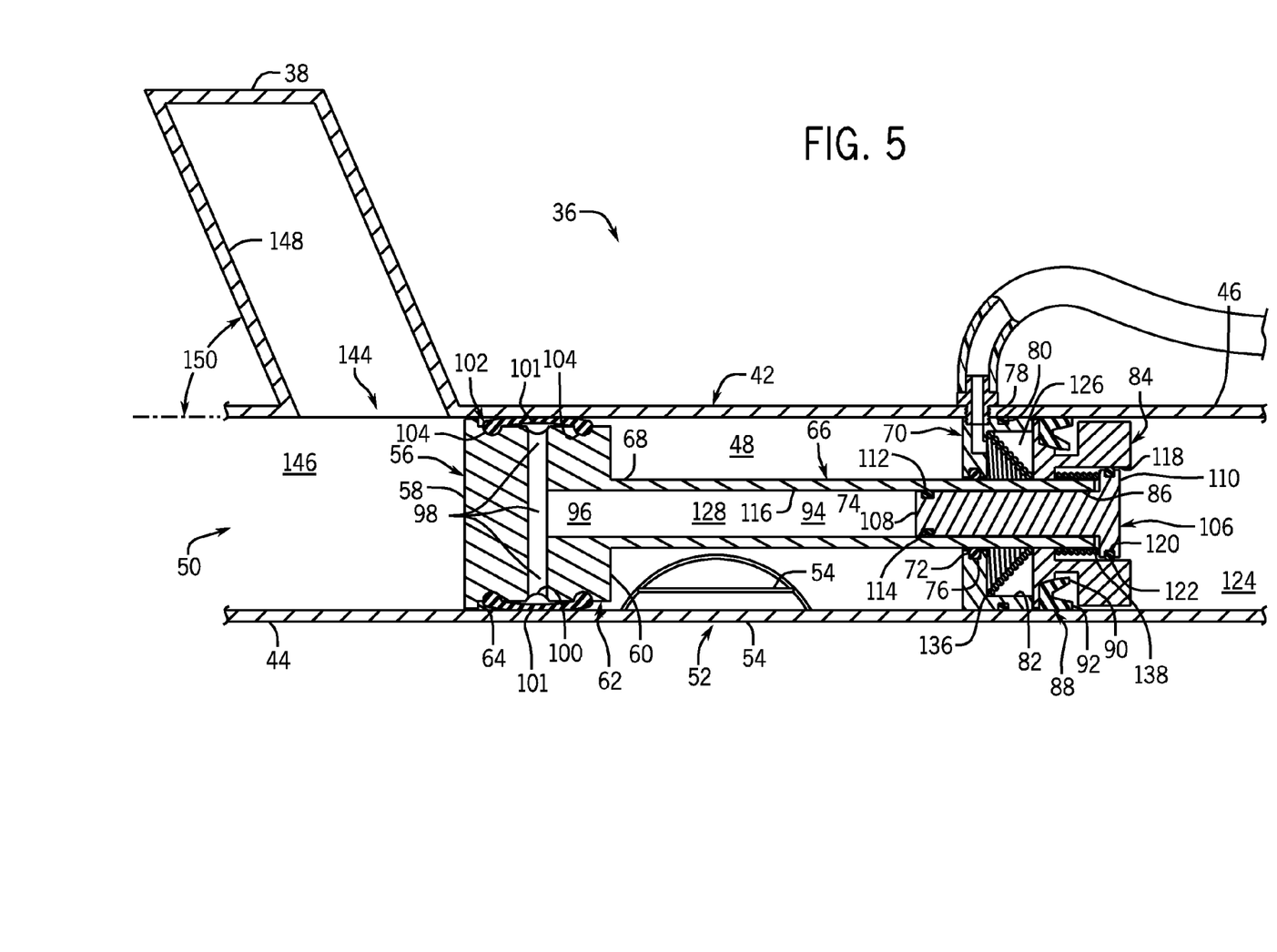
FIG. 5 is a partial section view of the example valve shown in FIG. 2 in which the granular material and fluid are substantially prevented from flowing through the valve.

In one embodiment, shown in FIGS. 3-5, an insert 106 is configured to moveably engage the axial passageway 94 in the connecting member 66. The insert 106 includes a shank 108 configured to slideably engage the axial passageway 94 and a flange 110. The insert 106 may be secured in the axial passageway 94 via a snap ring (not shown) capturing the flange 110, may be limited in travel by the second end 46 of the cylindrical body 42 (as shown), or be secured by any other method known in the art. The shank 108 includes an annular groove 112 in which a seal 114 (e.g., an o-ring) is seated to seal against the inner surface 116 of the axial passageway 94. In the example embodiment, the flange 110 of the insert 106 is sized to engage a cavity 118 formed in the piston 84 and may include an annular groove 120 capturing a seal 122 (e.g., an o-ring).

The configuration of the example valve 36 defines a series of chambers. An activation chamber 124 is defined between the piston 84 and the second end 46 of the cylindrical body 42. A return chamber 126 is defined between the stop member 70 and the piston 84. And, an insert chamber 128 is defined between the shank 108 of the insert 106 and the disk 56. The activation chamber 124, return chamber 126, and insert chamber 128 are used to operate the various features of the valve 36.

In operation, the valve 36 can be operated to both stop the flow of granular material (e.g., seed, fertilizer, etc.) and the flow of fluid (e.g., air, etc.) from the inlet 50 through the discharge 52. Specifically, the valve 36 can first stop the flow of granular material by moving the disk 56 between an open or flow position (shown in FIG. 3), at which the granular material and the fluid flow through the discharge 52, and a closed or plugged position upstream of the discharge 52 (shown in FIGS. 4 and 5), at which the flow of granular material through the discharge 52 is substantially prevented and the flow of air is reduced. With the flow of granular material restricted, the resilient member or flexible diaphragm 102 is moveable between a sliding or retracted position (shown in FIGS. 3 and 4) and an expanded or sealing position (shown in FIG. 5) at which the flexible diaphragm 102 engages the interior surface 48 of the cylindrical body 42 to substantially prevent the flow of air through the discharge 52. This configuration both minimizes damage to the granular material and conserves the limited supply of air available to motivate the granular material through the delivery lines 20.

With continued reference to FIGS. 3-5, the operation of the example valve 36 is described in greater detail. An activation source (e.g., a compressor, hydraulic pump, etc.) provides an activation medium (e.g., air, hydraulic fluid, etc.) via the valve line 40 to a control block 130. The control block 130 is operated in response to a controller (not shown) to selectively direct granular material from the primary containment tanks 16 into the secondary containments 18. The control block 130 may be some form of electrically actuated valve and may include a pressure regulator to control the working pressure of the activation medium given application-specific requirements.

When it is determined that a secondary containment 18 is filled to the requisite level, the control block 130 directs the activation medium (e.g., air as used in the example embodiment) into the activation chamber 124 via an activation line 132 coupled to an activation port 134. The force of the air in the activation chamber 124 acts on the larger surface area of the piston 84 to slide the piston 84, insert 106, connecting member 66, and disk 56 left (as shown in FIGS. 3 and 4). The pressure acting on the piston 84 is sufficient to overcome the resistive forces of the flowing granular material (and air) and a piston biasing member 136 (e.g., a compression spring) secured between the stop member 70 and the piston 84. The disk 56 slides leftward across the discharge 52 to the upstream side of the discharge 52 as shown in FIG. 4, thus restricting the flow of granular material through the discharge 52.

Approximately when the piston 84 abuts the flange 82 of the stop member 70, thus limiting the axial movement of the piston 84, the activation medium, acting on the smaller surface area defined by the flange 110 of the insert 106, urges the insert further into the insert chamber 128. The insert 106 is urged against the resistance of an insert biasing member 138 (e.g., a compression spring) and the compressive resistance provided by a medium captured in the insert chamber 128. As the insert 106 moves from the inactive position toward the active position, the volume of the insert chamber 128 is reduced. This forces a medium captured in the insert chamber 128 to flow into the radial passageways 98 formed in the disk 56 thereby causing the flexible diaphragm 102 to expand and contact the interior surface 48 of the cylindrical body 42. Thus, the flexible diaphragm 102 seals against the interior surface 48 to prohibit air from continuing to flow through the discharge 52 when the diaphragm 102 is in the sealing position.

To return the disk 56 to the open or flow position, in the example embodiment, the control block 130 is configured such that the activation medium is no longer in fluid communication with the activation chamber 124 and the activation chamber 124 is allowed to vent. The insert biasing member 138 urges the insert away from the second end 86 of the connecting member 66 to allow the flexible diaphragm 102 to move to the retracted position. The piston biasing member 136 urges the piston 84 toward the second end 46 of the cylindrical body 42 to allow granular material and air to flow through the discharge 52. As shown in FIG. 3, if additional force is required, the control block 130 may provide the activation medium via a return line 140 to a return port 142 that is in fluid communication with the return chamber 126. As the pressure in the return chamber 126 increases, the piston 84 is further urged toward the second end 46 of the cylindrical body 42. Alternatively, a separate return source (not shown) may be coupled to the return port 142 to provide the requisite force.

As one skilled in the art will appreciate, the insert 106, while in the preferred embodiment, is not required for the broadest valve 36. Specifically, removing the insert 106 and insert biasing member 138 from the valve 36 shown in FIG. 3 results in the activation chamber 124 being in fluid communication with the "insert" chamber 128 and the radial passageways 98 of the disk 56. Introducing the activation medium into the activation chamber 124 still results in the piston 84 and disk 56 moving into the plugged position and the flexible diaphragm 102 into the expanded position, thereby inhibiting the flow of granular material and air through the discharge 52.

A surge chamber 38 (best shown in FIGS. 4 and 5) provides a volume into which granular material may be urged into by the disk 56 as the disk 56 is moved into the closed or plugged position. The surge chamber 38 reduces the force required to actuate the valve 36 and reduces the forces imparted to the granular material. As shown in the example embodiment, the surge chamber 38 is positioned upstream of the discharge 52 and includes a lower opening 144 leading into an interior 146 of the cylindrical body 42. A transfer surface 148 is sloped toward the interior 146 at a transfer angle 150 that is approximately equal to or greater than an angle of repose defined by the granular material. The angle of repose is the natural angle established by the granular material if piled on a level surface and is defined between the level surface and the outer surface of the pile of granular material. As a result, provided the valve 36 is substantially horizontal, the granular material will be urged by gravity from the surge chamber 38 toward the interior 146 of the cylindrical body 42 when the disk 56 is returned to the open or flow position. The position of the surge chamber 38 relative to the disk 56 and the discharge 52 is preferably configured such that the surge chamber 38 is upstream and close to the disk 56 when the disk 56 is in the closed or plugged position. This relative positioning of the surge chamber 38 helps ensure repeated operation of the valve 36. The surge chamber 38 is oriented such that the granular material is cyclically urged into the surge chamber 38 by the disk 56, when the disk 56 is moved back toward the open position the granular material is urged nearly completely from the surge chamber 38 by gravity, and thus the surge chamber 38 is substantially devoid of granular material and ready to accept granular material during the next cycle of the disk 56 into the closed position.

One skilled in the art will appreciate the variety of suitable materials that may be used to form or construct the disclosed components. For example, the cylindrical body 42, disk 56, connecting member 66, stop member 70, and piston 84 may be formed of a variety of plastics, metals, composites, and the like depending upon the specific application requirements. As such, the claims should not be limited by any specific component composition.

Figure 7:
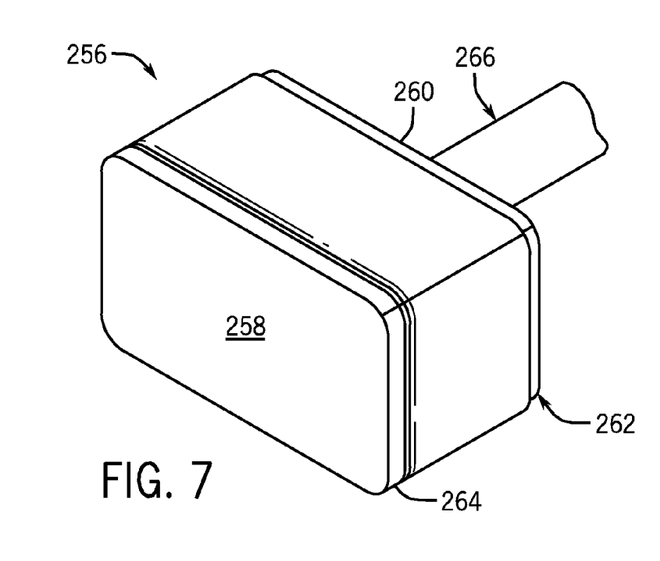

While the example embodiment is shown and described as incorporating a cylindrical disk 56 and body 42, one skilled in the art will appreciate that the valve 36 may have other form factors. Turning to FIG. 7, another example disk 256 and connecting member 266 are shown. Specifically, the disk 256 defines a generally rectangular upstream surface 258, a generally rectangular downstream surface 260 opposite the upstream surface 258, and a perimeter surface 262 that extends between the upstream surface 258 and the downstream surface 260. Similarly, the perimeter surface 262 includes a leading rim 264 that is closely toleranced to an interior surface of a generally rectangular body (not shown) such that the disk 256 may slideably engage an interior surface of the rectangular body during operation of the valve 36. Moreover, the connecting member 266 defines a generally square cross section.

Figure 8:
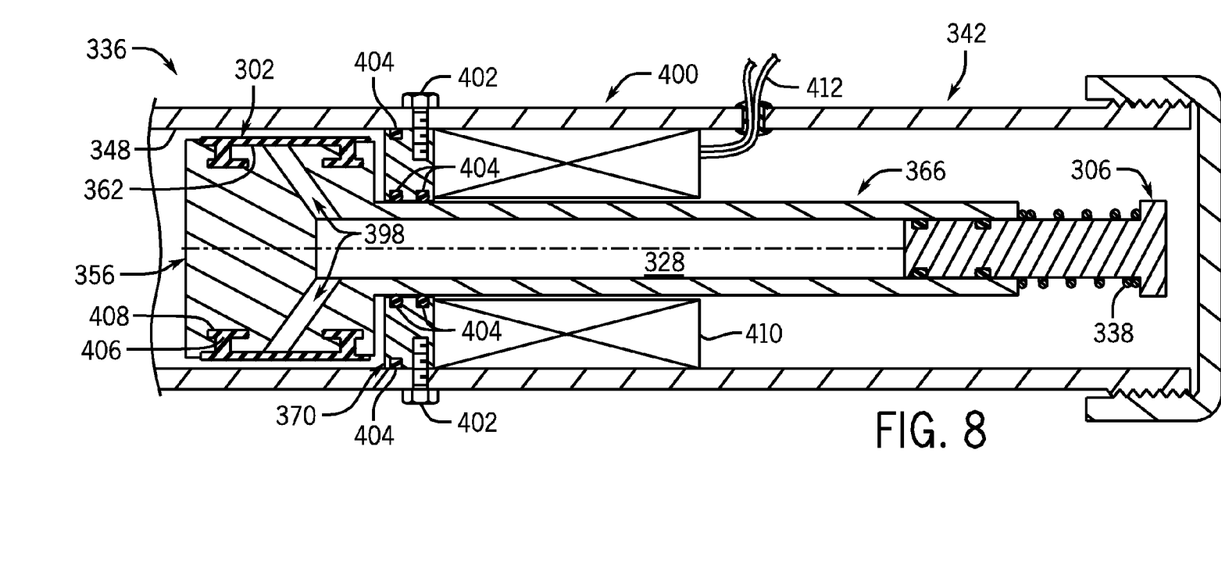
FIG. 8 is a partial section view of an alternative example valve.

With reference to FIG. 8, another alternative valve 336 is shown to incorporate an electromagnetic actuator 400. The electromagnetic actuator 400 is selectively energized and de-energized to control the movement and position of a connecting armature 366 and an armature insert 306. A stop member 370 is coupled to a body 342 via bolts 402 extending through the body 342 and into the stop member 370. A series of seals 404 restrict air and granular material from passing by the stop member 370. A coil 410 surrounds the connecting armature 366 and is operationally coupled to a controller (not shown) via leads 412.

As with the previous embodiment, the armature insert 306 is slideably engaged in an armature insert chamber 328 and biased away from a disk 356 by an armature biasing member 338. The disk 356 includes angled passageways 398 that extend proximate the armature insert chamber 328 and a perimeter surface 362 of the disk 356. The resilient member 302 is coupled to the perimeter surface 362 via a pair of annular protrusions 406 that seat in mating keyways 408 formed in the disk 356. As a result, the armature insert chamber 328 and the passageways 398 define a volume such that as the armature insert 306 slides into the armature insert chamber 328 a medium (e.g., air, hydraulic fluid, etc.) within the armature insert chamber 328 is urged toward the disk 356. The medium in the armature insert chamber 328 flows into the passageways 398 to ultimately expand the resilient member 302 to engage the interior wall 348.

As one skilled in the art will appreciate, in operation (and provided the appropriate connecting armature 366 and armature insert 306 material compositions) applying current to the coil 410 can cause the connecting armature 366 to move leftward (as shown in FIG. 8) and thus plug the opening (not shown) of the valve 336. Furthermore, as the armature insert 306 approaches the coil 410, it too will be urged leftward. The movement of the armature insert 306 forces medium in the armature insert chamber 328 toward the resilient member 302, ultimately resulting in an expansion of the resilient member 302.

Figure 9:
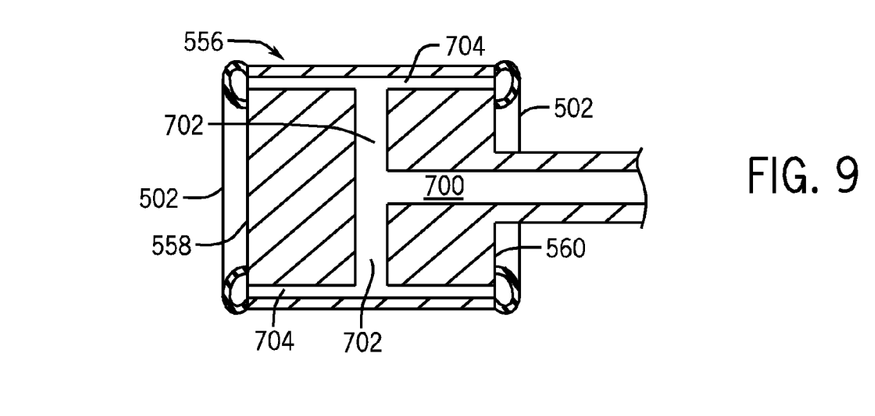
FIG. 9 is a partial section view of another alternative valve.

Turning to FIG. 9, a portion of another example valve is shown. Specifically, a disk 556 is depicted having a central passageway 700 leading to a pair of radial passageways 702 that in turn lead to axial passageways 704. A pair of resilient members 502 are operatively coupled to the upstream face 558 and downstream face 560, respectively, proximate the axial passageways 704. As a result, the resilient members 502 may be expanded to engage the interior wall of the body (not shown) to inhibit the flow of air past the disk 556 and through the discharge (not shown) when the disk 556 is in the closed or plugged position. Again, one skilled in the art will appreciate the variety of disk 556—resilient member 502 combinations in view of the present disclosure.

Several example embodiments of the invention have been described in considerable detail. Many modifications and variations to the example embodiments described will be apparent to a person of ordinary skill in the art. Therefore, the invention should not be limited to the example embodiments described.

I claim:

1. A valve for controlling a flow of a granular material and a flow of a fluid, comprising:
   a body having a first end, a second end, and defining an interior surface;
   an inlet formed proximate the first end of the body for receiving the granular material and the fluid;
   an outlet formed downstream of the inlet for selectively discharging the granular material and the fluid; a surge chamber positioned upstream of the outlet and in fluid communication with an interior of the body;
   a first member slideably captured within the body and including an upstream surface, a downstream surface opposite the upstream surface, and an annular surface extending between the upstream surface and the downstream surface;
   a resilient member operationally coupled to the annular surface on the first member;
   wherein the first member is moveable between an open position at which the granular material and the fluid flow through the outlet, and a closed position upstream of the outlet at which the granular material is substantially prevented from flowing through the outlet; and
   wherein the resilient member is moveable between a retracted position and an expanded position at which the resilient member is engaged with the interior surface to substantially prevent the fluid from flowing through the outlet.

2. The valve of claim 1, wherein the surge chamber defines a transfer surface that is sloped toward the interior of the body at a transfer angle approximately equal to or greater than an angle of repose defined by the granular material.

3. The valve of claim 1, wherein the first member further comprises:
   an upstream surface, a downstream surface opposite the upstream surface, and an annular surface extending between the upstream surface and the downstream surface;
   wherein the resilient member is operationally coupled to at least one of the upstream surface and the downstream surface of the first member.

4. The valve of claim 1, further comprising at least one electromagnetic actuator operationally coupled to at least one of the first member to selectively move the first member between the open position and the closed position, and the resilient member to selectively move the resilient member between the retracted position and the expanded position.

5. The valve of claim 1, further comprising:
   a first passageway formed within the first member that is in fluid communication with the annular surface and an activation source;
   wherein the activation source selectively directs an activation medium within the first passageway to move the resilient member to the expanded position.

6. The valve of claim 5, further comprising:
   a connecting member coupled to and extending from the first member toward the second end of the body;
   a second member spaced apart from the first member and coupled to the connecting member; and
   an activation chamber defined by the second member, the second end of the body, and the interior surface;
   wherein the activation source is in selective fluid communication with the activation chamber to move the first member to the closed position.

7. The valve of claim 6, further comprising:
   a second passageway formed in the connecting member; and
   an insert configured to moveably engage the second passageway defining an insert chamber;
   wherein the second passageway is in fluid communication with the first passageway formed within the first member;
   wherein the insert is moveable between an inactive position defining a first volume of the insert chamber and an active position defining a second volume of the insert chamber;
   wherein the second volume of the insert chamber is less than the first volume of the insert chamber; and
   wherein moving the insert to the active position moves the resilient member to the expanded position.

8. The valve of claim 7, further comprising a stop member positioned proximate the outlet and between the first member and the second member to limit an axial travel of the first member and the second member within the body.

9. The valve of claim 8, further comprising:
   a first biasing member urging the first member toward the stop member; and
   a second biasing member urging the insert toward the inactive position.

10. The valve of claim 9, wherein:
    the first biasing member comprises a first compression spring positioned between the stop member and the second member; and
    the second biasing member comprises a second compression spring positioned between the second biasing member and a flange formed on the insert.

11. The valve of claim 8, further comprising:
    a return chamber defined between the stop member and the second member; and a return port in fluid communication with the return chamber and in selective fluid communication with a return source;

wherein when the return port is in fluid communication with the return source the second member is biased toward the second end of the body.

12. A method of controlling a flow of a granular material and a flow of a fluid, comprising:

providing a body having a first end, a second end, defining an interior surface, an inlet formed proximate the first end of the body for receiving the granular material and the fluid, an outlet formed downstream of the inlet for selectively discharging the granular material and the fluid, a surge chamber positioned upstream of the outlet and in fluid communication with an interior of the body, a first member slideably captured within the body and including an upstream surface, a downstream surface opposite the upstream surface, and an annular surface extending between the upstream surface and the downstream surface, and a resilient member operationally coupled to the annular surface on the first member;

actuating the first member from an open position at which the granular material and the fluid flow through the outlet to a closed position upstream of the outlet at which the granular material is substantially prevented from flowing through the outlet; and actuating the resilient member from a retracted position to an expanded position at which the resilient member is engaged with the interior surface of the body to substantially prevent the fluid from flowing through the outlet.

* * * * *